Figure 1:
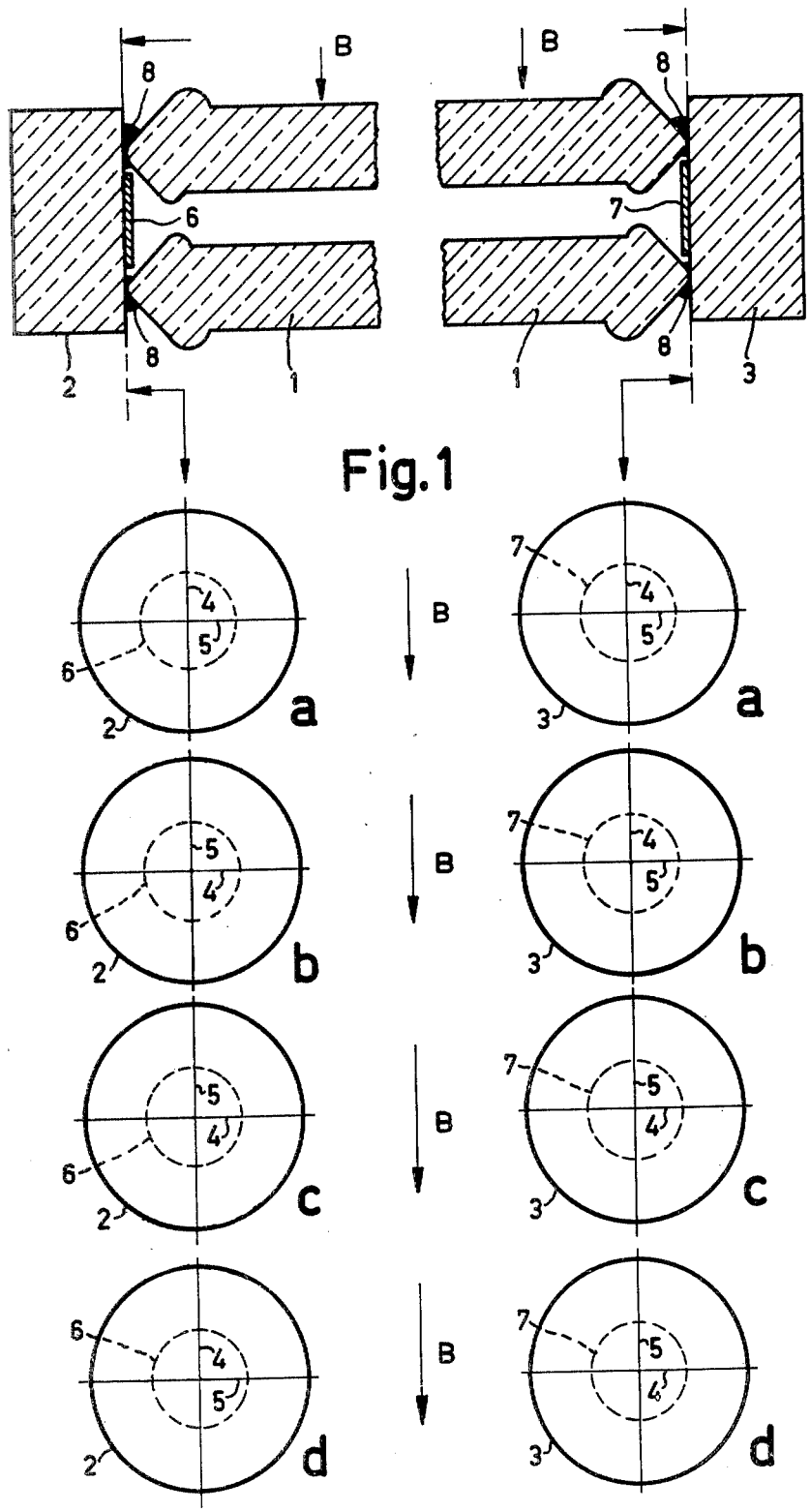

United States Patent [19]

Keijser et al.

[11] 4,152,673
[45] May 1, 1979

[54] GAS DISCHARGE LASER

[75] Inventors: Robertus A. J. Keijser; Bram J. Derksema; Leendert Vriens, all of Eindhoven, Netherlands

[73] Assignee: U.S. Philips Corporation, New York, N.Y.

[21] Appl. No.: 914,860

[22] Filed: Jun. 12, 1978

Related U.S. Application Data

[63] Continuation of Ser. No. 834,671, Sep. 19, 1977, abandoned.

[30] Foreign Application Priority Data

Jul. 2, 1975 [NL] Netherlands .................. 7507853

[51] Int. Cl.² .............................................. H01L 3/00
[52] U.S. Cl. .................... 331/94.5 G; 331/94.5 C; 331/94.5 M
[58] Field of Search .............. 331/94.5 G, 94.5 C, 331/94.5 M

[56] References Cited

U.S. PATENT DOCUMENTS

| | | | |
|---|---|---|---|
| 3,496,483 | 2/1970 | Max ............................ | 331/94.5 |
| 3,436,677 | 4/1969 | Max ............................ | 331/94.5 |
| 3,509,487 | 4/1970 | Bowhuis ...................... | 331/94.5 |
| 3,938,060 | 2/1976 | Kato ............................ | 332/7.51 |

OTHER PUBLICATIONS

Hernquist, *Journal of Appl. Phys.*, vol. 40, 1969, p. 5399.
McMohon, *Rev. Sci. Instr.*, vol. 40, May 1969, pp. 727–728.

*Primary Examiner*—Martin H. Edlow
*Attorney, Agent, or Firm*—Bernard Franzblau

[57] ABSTRACT

A gas discharge laser in which the light beam emanating from said laser is linearly polarized by applying a transverse magnetic field in which reflectors are used which are more or less anisotropic and the anisotropy axes of which have a precise orientation relative to the magnetic field so that a high degree of polarization is obtained.

3 Claims, 2 Drawing Figures

GAS DISCHARGE LASER

The invention relates to a gas discharge laser having reflectors (laser mirrors) connected near the two ends of the part of the discharge tube forming the laser tube, in which the light beam emanating from the gas discharge laser is linearly polarized by applying a transverse magnetic field the direction of which is substantially normal to the axis of the laser tube. The magnetic field is generated by a magnet placed near the laser tube.

Such a gas discharge laser is known from the Review of Scientific Instruments 40, May 1969, pp. 727-8, in which the said transverse magnetic field has a strength of 500 to 1000 Gauss and is applied along a 3 to 6 cm length of the discharge. The magnetic field was obtained by arranging a permanent magnet near the laser tube. In this case a good linear polarization of the light emanating from the laser was obtained in which the orientation and position of the magnetic field proved not to be critical. Our investigations have proved that in these previous experiments very good isotropic reflectors must have been used, since otherwise variations, and sometimes drastic ones, occur in the linearity of the polarization with a varying orientation of the magnetic field in a plane normal to the axis of the laser tube. Such isotropic reflectors are difficult to manufacture and hence expensive and consequently are not attractive for use on a large scale.

It is also known that lasers having a good linear polarization can be obtained by using instead of a magnetic field one or more Brewster windows in the laser. In this case mirror anisotropics, if present, hardly constitute a drawback. A problem in the construction of such a laser, however, is that stringent requirements have to be imposed upon the optical quality of the Brewster windows and furthermore the efficiency will nevertheless always be smaller as a result of extra losses.

It is an object of the invention to provide a laser construction in which a good linear polarization of the laser light in a direction which can be previously predicted is obtained by means of a transverse magnetic field, and without stringent requirements being imposed upon the isotropy of the reflectors.

According to the invention, a gas discharge laser of the above type is characterized in that two phase-anisotropic (double refractive) reflectors are used. The directions of the anisotropy axes of one reflector substantially coincide with or are substantially at right angles to the anisotropy axes of the other reflector. The direction of the magnetic field substantially coincides with one of the anisotropic axes of the reflectors.

The invention is based on the recognition of the fact that the unfavourable influence of the phase-anisotropy of the mirrors on the linear polarization of the laser beam is considerably reduced when the anisotropy axes of the laser mirrors coincide with (or are at right angles to) the direction of the (polarizing) transverse magnetic field. The anisotropy axes of the laser mirrors are to be understood to mean the axes between which the difference in optical path length in the laser tube in the direction of the axis of the laser tube is a maximum. In the conventional vapour-deposition processes the anisotropy of the reflectors is caused during the incomplete isotropic vapour-deposition of the multilayer coating used in said reflectors. Such a multilayer coating is manufactured by the alternate vapour-deposition of dielectric layers having a high and a low index of refraction. The anisotropy axes are directly associated with the vapour-deposition geometry (e.g. the direction of vapour deposition) and can be fixed in a reproduceable manner, for example by providing marks on the reflectors. By providing the mirrors with the anisotropy axes in the desired direction on the laser tube, a laser is obtained, as has been proved experimentally, which has a good linearity of the polarization in a previously fixed direction.

Figure 2:
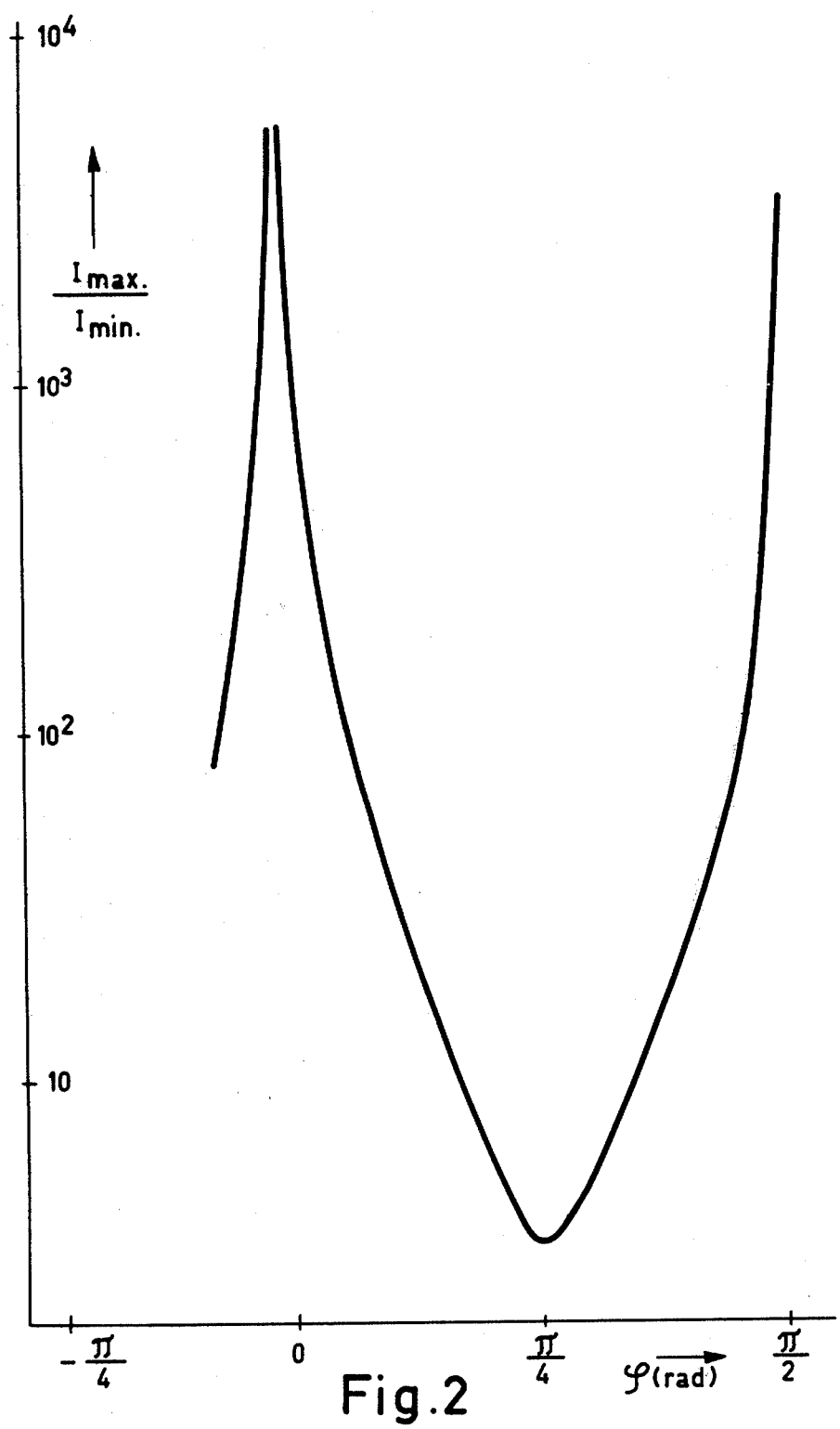

The invention will now be described in greater detail with reference to the drawing, in which:

FIG. 1 shows various possible orientations of the anisotropy axes relative to the applied transverse magnetic field and, FIG. 2 shows how the polarization of the laser light depends on the angle which the transverse magnetic field makes with the anisotropy axes of the reflectors.

FIG. 1 shows diagrammatically a laser. Reflectors 2 and 3 having reflective multilayer coatings 6 and 7 are directly secured by means of a sealing cement 8 to the preferably cylindrical part of the gas discharge tube which forms the laser tube 1. A transverse magnetic field B is applied normal to the axis of the laser tube 1. The anisotropy axes 4 and 5 are shown diagrammatically on the reflectors. The various orientations of the anisotropy axes and the magnetic field which can be used according to the invention are denoted in FIGS. 1a, b and c and d. The laser may be of the coaxial type or of the side arm type.

In the case of a He-Ne laser with a strong transverse magnetic field B of approximately 1000 Gauss, all the laser modes are polarized in the direction of said magnetic field. Such a laser may, for example, have the following laser parameters:

| | |
|---|---|
| length of laser tube approximately | 250 pm |
| length of active discharge approximately | 205 mm |
| current through the discharge | 6.4 mA |
| inside diameter of laser tube approximately | 1.8 mm |
| Gas filling | 15% No |
| | 85% $^4$Ho |
| gas pressure | 2.3 torr |
| rosonator configuration | nearly hemispherical |
| output power | 1-2 mWatt at 6328 Å. |

One of the laser mirrors, the output mirror, has a transmission of approximately 1%. A homogeneous transverse magnetic field can be obtained by means of two magnetic pole shoes present on opposite sides of the laser tube.

It will be obvious that the invention is not restricted to the above-described He-Ne laser and to transverse magnetic fields of approximately 1000 Gauss. The gist of the invention is to obtain a gas discharge laser having a very good linearity of the polarisation in a well defined direction by causing the directions of anisotropy of the laser mirrors to coincide with the direction of the transverse magnetic field.

FIG. 2 shows how the polarization of the laser light depends on the angle which the transverse magnetic field makes with the anisotropy axes of the reflectors. The ratio of the maximum intensity $I_{max}$ to the minimum intensity $I_{min}$ of the laser beam originating from the laser after passing through a polariser is plotted vertically. The measurements shown were made with a He-Ne laser with a transverse magnetic field of approximately 1000 Gauss active throughout the length (20 cm)

of the active (laser) discharge. In the case shown in FIG. 2 the corresponding anisotropy axes of the reflectors extended substantially parallel to one another. The phase anisotropy of the mirrors, which may be expressed as the optical path length difference along the two anisotropy axes, is in this case of the order of 1 Å.

In the situations in which the corresponding anisotropy axes of the reflectors extend substantially parallel (FIGS. 1a and c), a very good linear polarization (ratio $I_{max}:I_{min}$ better than 2000:1) is obtained near $\psi=0$ and $\phi=\pi/2$, that is with the magnetic field parallel to one of the anisotropy axes.

It has even been found that the anisotropy axes may be at a small angle to each other without this degrading the good linearity of the polarization. This angle depends on the magnitude of the mirror anisotropies and on the desired linearity of the polarization (even with an angle to 10°, the ratio $I_{max}:I_{min}$ is in many cases better than 500:1). As a result of this, the provision of the reflectors is comparatively easy and the fixing of the anisotropy directions during the manufacture is not very critical.

When the corresponding anisotropy axes of the reflectors are substantially at right angles to each other (FIGS. 1b and d) it appears that on average the linearity of the polarization is better than in the case mentioned in the previous paragraph. A drawback of this situation, corresponding to FIGS. 1b and d, is, however, that the angles at which the ratio $I_{max}:I_{min}$ is a maximum can differ considerably from $\psi=0$ or $\phi=\pi/2$ if the anisotropy axes are not very accurately at right angles to each other.

The invention enables the simple and cheap manufacture of gas discharge lasers having a very good linear polarisation of the laser light in a well-defined direction by using the fixed anisotropy directions of the laser mirrors.

What is claimed is:

1. A gas discharge laser which comprises: a discharge tube forming a laser tube, a reflector disposed proximate to each end of said discharge tube, means for linearly polarizing a light beam emanating from the gas discharge laser, said polarizing means generating a transverse magnetic field having a direction which is substantially normal to the axis of said laser tube, said means including a magnetic proximate to said laser tube, each of said reflectors having two anisotropic optical axes disposed in perpendicular relationship with one axis of one reflector being substantially parallel to one axis of the other reflector, the direction of the magnetic field produced by said magnet being substantially coincident with one of the anisotropy axes of said reflectors.

2. A gas laser as claimed in claim 1 wherein the anisotropic axes of one reflector are substantially parallel to the corresponding anisotropic axes of the other reflector.

3. A gas laser as claimed in claim 1 wherein the anisotropic axes of one reflector are substantially at right angles to the corresponding anisotropic axes of the other reflector.

* * * * *

UNITED STATES PATENT AND TRADEMARK OFFICE
CERTIFICATE OF CORRECTION

PATENT NO. : 4,152,673

DATED : May 1, 1979

INVENTOR(S) : Robertus A.J. Keijser Et Al

It is certified that error appears in the above-identified patent and that said Letters Patent are hereby corrected as shown below:

In the Title Page, "[63]" after abandoned. delete "." and insert --,which is a Continuation of Ser. No. 701,697, July 1, 1976, abandoned.--

Col. 2, line 35, change "250 pm" to --250 mm-- line 39, change "15% No" to --15% Ne-- line 40, change "85% $^4$Ho" to --85% He--

Col. 3, line 11, change "$\phi=\pi/2$" to --$\psi=\pi/2$-- line 31, change "$\phi=\pi/2$" to --$\psi=\pi/2$--

Col. 4, line 16, change "magnetic" to --magnet--

Signed and Sealed this

Fifteenth Day of June 1982

[SEAL]

Attest:

Attesting Officer

GERALD J. MOSSINGHOFF

Commissioner of Patents and Trademarks